(12) United States Patent
Grossman

(10) Patent No.: US 7,912,897 B2
(45) Date of Patent: *Mar. 22, 2011

(54) METHOD SYSTEM AND STORAGE MEDIUM FOR FACILITATING WEB SEARCHING AND BRAND RECOGNITION CAPABILITIES OVER A COMPUTER NETWORK

(75) Inventor: James Grossman, Westport, CT (US)

(73) Assignee: Qiuntrap Development P.R. LLC, Wilmington, DE (US)

( * ) Notice: Subject to any disclaimer, the term of this patent is extended or adjusted under 35 U.S.C. 154(b) by 1042 days.

This patent is subject to a terminal disclaimer.

(21) Appl. No.: 11/679,217

(22) Filed: Feb. 27, 2007

(65) Prior Publication Data
US 2007/0150374 A1    Jun. 28, 2007

Related U.S. Application Data

(63) Continuation of application No. 10/136,105, filed on May 1, 2002, now Pat. No. 7,191,210.

(51) Int. Cl.
*G06F 13/00* (2006.01)
(52) U.S. Cl. ...................................................... 709/203
(58) Field of Classification Search .................. 709/203
See application file for complete search history.

(56) References Cited

U.S. PATENT DOCUMENTS

| | | | |
|---|---|---|---|
| 6,064,979 A | 5/2000 | Perkowski | |
| 6,226,648 B1 | 5/2001 | Appleman et al. | |
| 6,269,361 B1 | 7/2001 | Davis et al. | |
| 6,839,702 B1 | 1/2005 | Patel et al. | |
| 2001/0007991 A1 | 7/2001 | Tobin | |
| 2001/0016846 A1 | 8/2001 | Chakrabarti et al. | |
| 2001/0042064 A1 | 11/2001 | Davis et al. | |

OTHER PUBLICATIONS

You've got fraud!, Peter Lewis on technology, pp. 227-230, FORTUNE, Sep. 3, 2001.
Revisiting Web Search Engines, Features and Commands, Ran Hock, pp. 18-24, ONLINE, Sep./Oct. 2001.

*Primary Examiner* — Robert B Harrell
(74) *Attorney, Agent, or Firm* — Connolly Bove Lodge & Hutz LLP

(57) ABSTRACT

An exemplary embodiment of the invention relates to a method, system, and storage medium for facilitating website searching and brand recognition capabilities over a computer network. The system comprises a server, a search engine in a communication with the server, and a website marking tool including a user interface executing on the server. The website marking tool provides registration services for qualified websites. The system also comprises a data storage device in communication with the server. The data storage device stores databases of registered website addresses. The website marking tool provides distinctive marking indicia to the registered website addresses for promoting brand recognition and facilitating website searching by distinguishing the registered website addresses from non-registered website addresses displayed at the at least one user system as a result of conducting a web search. The invention also comprises a method and storage medium for implementing the website marking tool.

33 Claims, 5 Drawing Sheets

SEARCHSCAPE

FILE  EDIT  VIEW  HELP

SEARCH RESULTS FOR: YANKEES BASEBALL.
RETURNING 1-20 OF 216 HITS

1. JUNIOR LEAGUE BASEBALL: ST. LOUIS YANKEES
http://www.juniorleaguebaseball.com/

2. YANKEE PRODUCTS – offering collectibles and gifts
http://www.yankeecollectibles.com 3. SPORTSONE.com – team news, roster, stats, schedule
http://sportsone.com 4. DYLAN'S NEW YORK YANKEE WEBSITE – includes current news, history, schedules
http://www.dylansyankees.com

. . .

20. NEW YORK YANKEES ************************************************
official site – http://www.yankees.mlb.com/

START                                                          1:26PM

402

MYBUSINESS.COM
..................................>
FIG. 5A

..................................
MYBUSINESS.COM
..................................
FIG. 5B

MYBUSINESS.COM
.>.>.>.>.>.>.>.>.>.>.
FIG. 5C

MYBUSINESS.COM************
FIG. 5D

MYBUSINESS▫COM
FIG. 5E

US 7,912,897 B2

METHOD SYSTEM AND STORAGE MEDIUM FOR FACILITATING WEB SEARCHING AND BRAND RECOGNITION CAPABILITIES OVER A COMPUTER NETWORK

CROSS REFERENCE TO RELATED APPLICATIONS

This application is a continuation of U.S. application Ser. No. 10/136,105, filed May 1, 2002, now U.S. Pat. No. 7,191,210.

BACKGROUND

This invention relates to organizing, categorizing, and linking World Wide Web search activities, and more particularly, the present invention relates to a method and system for identifying, categorizing, registering, and locating official brand and true company websites over a computer network.

Performing searches on the World Wide Web (WWW) has become a popular form of information gathering and retrieval. Search engines such as Yahoo®, Google®, and Altavista® allow individuals to search for URLs, web pages, websites, and other information on the Internet. Search results include references to uniform resource locator (URL) addresses of web pages and other data that satisfy the search criteria entered by the individual. One or more keywords can be provided by the user as the criteria of the search request.

Publishing information on the web is inexpensive as compared to other publishing channels such as printed media, radio, television, etc. As such, the amount of data available on the web has been growing and continues to expand at an amazing rate, resulting in almost limitless amounts of information on virtually any topic. There are, however, disadvantages resulting from this growth. Even a well-planned web search can return an overwhelming sea of contrary, deceptive, and confusing information. With the vast amount of published sites and links available, conducting accurate and successful searches usually requires some boolean-based search knowledge before meaningful and substantive information can be found. Generalized key word searches can produce thousands of documents and links containing the selected key word which has been flagged (and the costs incurred are often in direct proportion to their priority of listing) and retrieved by a search engine, often resulting in slow information retrieval, too much information, or contradictory or misleading information. Thus, for businesses, brand organizations, individuals, and government that are working to establish an Internet presence, existing search engine tools are often inadequate and sometimes abused.

In order to conduct business on the Internet a business owner must register a domain name, which translates the numeric IP address into a more recognizable form. Every domain name must be unique to avoid communication errors and they are assigned on a first-come, first-served basis. Historically, domain names were not 'per se' protectable as intellectual property. Anyone could register a domain name, variations of a name, and product names and services for an already-established trademark. In fact, many people have registered domain names with trademarks without direct or legal relationship to the trademark owners.

Other individuals purchased domain names that were subject to trademarks for the sole purpose of selling them for a profit or for diverting business from their rightful owners. These individuals were referred to as 'cyber squatters'. Asking prices ranged from a few hundred dollars to a few million dollars, compared to the usual one hundred dollar fee for a two-year registration through a domain registration service.

For example, the domain name for MTV® was acquired by a former employee, effectively preventing the company from using it. In recent years this has changed. An individual who had registered panavision.com was forced to relinquish the domain name to Panavision, Inc. because the court found that the registrant had violated the Federal Trademark Dilution Act in the United States, despite the fact that a domain name was not considered to be a trademark. This has made it possible for trademark owners to obtain the domain names that contain their trademark names or variations of their trademark names.

A related issue involves individuals or adversaries of a company registering a domain name that is misleading or negatively reflects the company. As a result, many businesses have registered multiple variations of their domain name in order to prevent customers from using these domains to express their views on these companies. For example, Chase Manhattan Bank acquired the domains Chasesucks.com, IhateChase.com, and ChaseStinks.com. Unfortunately, this has not been successful in stopping this abusive practice as it would be difficult, if not impossible, to anticipate every conceivable variation of a name.

Another issue involves exploiting the popularity of a famous brand name by including certain key words into a web page that are likely to be picked up in a search regardless of the relevance of these key words to the site. Savvy website proprietors have been known to strategically and purposefully interpose popular keywords into their web pages in order to increase their site's visibility and web presence by ensuring that their websites will be picked up during a search as well as paying for placement in the search engine. Thus, many searches can lead to information that has no actual direct or logical connection to the products, companies, or brands being searched.

In the United States, free speech laws prevent the system from banning people from using desired domains. Further, registering all domains that contain a certain keyword would be impractical, very costly, and would not solve the shortcoming and limitations described above.

A recent attempt to solve the shortcomings described above is a new initiative to add seven new top-level domains to the current domains (i.e., .com, .org, .net, .gov). For example, a business-oriented domain has been adopted by the Internet Corporation for Assigned Names and Numbers (ICANN) which is the governing body overseeing the global Internet domain name system in order to augment and expand the existing domain name system. Neulevel, Inc., the exclusive registry operator of the ".biz" top-level domain ("TLD"), is currently implementing a registration service for all business owners who wish to register their sites under this classification. Registrants must be room engaged in a commercial business as defined by the ICANN-approved registry.

Although the ".biz" solution purportedly filters out the non-business ".com" information, it can still yield vast numbers of web sites, which are incorrect and can distract the searcher from his/her search objectives. For example, a key word search for Chrysler® automobiles could yield dozens of used car dealerships, repair shops, detailers, insurers, as well as the official Chrysler® website. What is needed, therefore, is a method and system for facilitating web searching activities that overcome the limitations and disadvantages stated above.

BRIEF SUMMARY

An exemplary embodiment of the invention relates to a method, system, and storage medium for facilitating website searching and brand recognition capabilities over a computer network. The system comprises a server, a search engine in communication with the server, and a website marking tool including a user interface executing on the server. The website marking tool provides registration services for qualified websites, businesses, and individuals. The system also comprises a data storage device in communication with the server. The data storage device stores databases of registered website addresses and links. The website marking tool provides distinctive marking indicia to the registered website addresses for promoting brand recognition and facilitating website searching by distinguishing the registered website addresses from non-registered website addresses displayed at the at least one user system as a result of conducting a web search. The invention also comprises a method and storage medium for implementing the website marking tool.

BRIEF DESCRIPTION OF THE DRAWINGS

Referring now to the drawings wherein like elements are numbered alike in the several FIGURES:

FIG. 4 is a computer screen window displaying the results of a search including URLs with distinctive markings applied to selected uniform resource locators in one embodiment; and FIGS. 5A-5E illustrate various types of distinctive markings that may be applied to selected uniform resource locators.

DETAILED DESCRIPTION OF THE PREFERRED EMBODIMENT

Figure 1:
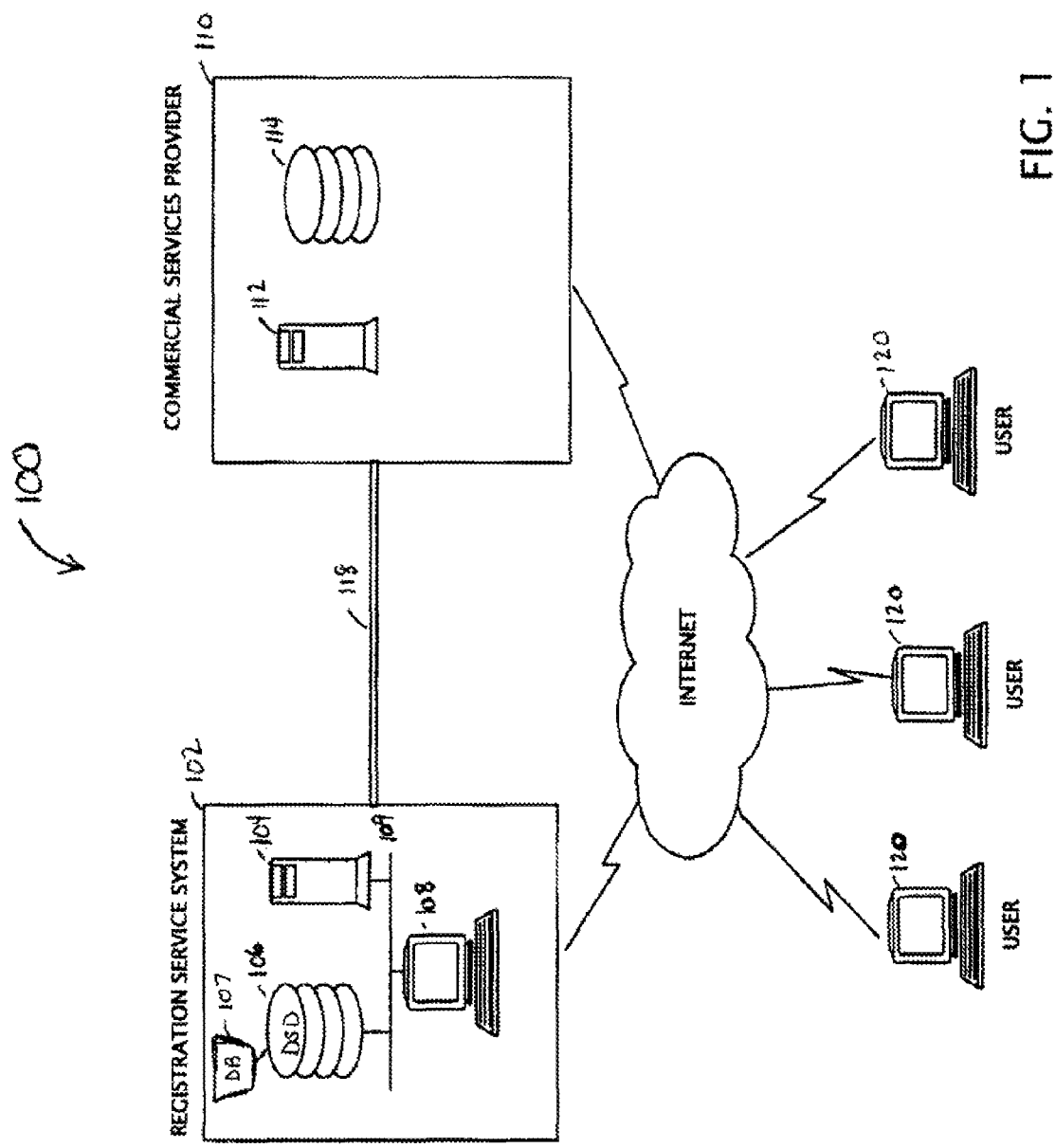
FIG. 1 is an exemplary computer network system upon which the invention is implemented in a preferred embodiment.

In an exemplary embodiment, the website marking tool is implemented via a computer network system such as system 100 of FIG. 1. System 100 comprises a registration service and level approval system 102 which executes the website marking process described herein. Registration service system 102 includes a server 104 coupled to a data storage device 106 and a workstation 108. Server 104 includes enterprise applications software typically found in a business enterprise such as web server software, word processing, billing, database management, groupware, email, security, encryption, in addition to the website marking tool of the invention. Server 104 executes a search engine tool or has access to a search engine as described further herein. In an exemplary embodiment, the website marking tool is executed via registration service system 102 although some or all of the tasks may be shared or provided by commercial services provider 110 and/or user systems 120 in order to realize the advantages of the invention. Data storage device 106 stores information used by registration service provider 102 including customer accounts relating to registered URLs of customer websites and links, as well as links to specific pages within or affiliated with a customer and associated addresses. These items are stored in a registered website database or third party user system 107 located in data storage device 106.

Data storage device 106 may comprise any form of mass storage device configured to read and write database type data maintained in a file store and is logically addressable as a consolidated data source across system 100. Information stored in data storage device 106 is retrieved and manipulated via server 104. It will be understood that more than one server may be utilized by registration service system 102 in order to accommodate high volume registration activities as described further herein. Further, data storage device 106 and server 104 may comprise a single unit. Communications among server 104, data storage device 106 and workstation 108 may be accomplished by any suitable networking infrastructure known in the art including wireless technology, radio-based communications, telephony-based communications, imbedded communications or a combination of the above. For purposes of illustration, however, the networking infrastructure employed by registration service system 102 is an Intranet 109. Workstation 108 may be any general purpose computer device such as a personal computer or laptop with a computer processor, display device, and suitable input/output devices such as a mouse, keyboard, printer, biometric reader, code reader, etc. Workstation 108 may be accessed by authorized users of registration service system 102 such as customer service personnel, sales personnel, and system administrators in order to process the activities described herein with respect to the features and functions of the website marking tool. Although one workstation 108 is shown, any number of workstations may be utilized by registration service system 102.

Also included in system 100 is commercial services provider 110 which may be an online service provider, search engine company, commercial web browser, commercial portal system, domain name registrar, trade association or civic group, or other entity representing a legitimate group of members. Alternatively, commercial services provider 110 may provide the services described herein via off-line processes or a combination of off-line and on-line processes. A commercial portal system refers to a world wide website that is a general starting or portal site for users upon connecting to the web or that users tend to visit as an anchor site for finding information. Portals usually contain a variety of content in the form of news, information, links and services and are commonly known to those skilled in the art. Commercial services provider 110 includes a server 112 coupled to a data storage device 114. Server 112 includes enterprise applications software typically found in a business enterprise as described above with respect to server 104. Further, server 112 and data storage device 114 may comprise a single unit. Registration service system 102 and commercial services provider 110 may be in communication via the Internet, Extranet 118, or other known communications systems or media, User systems 120 represent computer users who are looking for information on the web or who wish to register one or more URLs in order to acquire recognition as an official site. User systems 120 may also represent online businesses which purchase goods and/or services from a registered, official website owner for subsequent sale. These businesses, individuals, or organizations may wish to access only official registered websites for procuring goods and services or conducting transactions in order to ensure their integrity and avoid counterfeit and/or unlicensed products. Likewise, user systems 120 may include consumers who wish to procure only legitimate items from a reputable website. Finally, user systems 120 may include federal government or consumer advocacy entities, celebrities, media personalities, political parties, or agencies that utilize the website marking services of the tool alone or in conjunction with registration service system 102. User systems 120 may be any web-enabled, general-purpose computer processing devices employing web browser software and an Internet service connection.

Filters, customizable parameters with selectable options may be installed on user systems 120 and/or commercial services provider 110 in order to prevent or limit the receipt of email and/or for eliminating web search results received from non-registered entities.

In one embodiment, registration service system 102 provides access to its database of registered sites and a user interface but not its registration services to commercial services provider 110 wherein commercial services provider 110 is a search engine or web browser. Access may be through Extranet 118 or via the search engine's link to authorized registration databases of data storage device 106. Alternatively, commercial services provider 110 may download (or receive by other channels of distribution) web marking tool software and databases as necessary to provide search functions provided by the web marking and identification tool. It will be understood that the use of the term "registered" refers to the registration of official websites via the web marking tool unless otherwise provided and is not to be confused with the registration of domain names for a website.

In an alternate embodiment, registration service system 102 provides access via hypertext transfer protocol (HTTP) links to all or selected databases and registration services wherein commercial services provider 110 is a web portal, online services provider, or domain name registrar or approved agent. Likewise, commercial services provider 110 may download, or alternatively receive via third-party providers, web marking tool software and databases as described above or may access the tool via a link to registration service system 102.

In yet another embodiment, registration service system 102 may operate as an independent web portal, providing the web marking tool services as well as specialized search tools and customizable content targeted to its audience. For example, registration service system 102 may elect to become an authorized domain name registrar whereby potential website owners can directly seek registration of their domain names, register as an official site, and receive additional services such as research traffic patterns, product fulfillment information, email, business news, and other content. Registration services can be obtained directly by user systems 120 at the portal.

As a website or a web portal, registration service system 102 may provide a variety of services and/or products to its registered customers as well as consumers. The user interface of the web marking tool may provide logos, icons, images, imbedded information, color, sound, video, electronic signal, embedded information, and smartcard media-associated devices to read, store, configure, access, or link viewing and timing program elements with registered sites along with links to the respective website, links, web page, etc.

The user interface may also provide assistance to users in the form of a common inquiry page that may be customizable, providing a variety of services such as fulfillment of samples, follow-up phone calls, appointment setting, feedback, suggestions, and email communications relating to goods and services in order to facilitate the use of the tool. These services may further be customized by relevance, amount of time a user wishes to spend on a page and a recap feature for recapping important points. For example, the user may request that a specific amount of time (e.g., 20 seconds) be spent at each site or the user may select relative time periods such as short, medium or long. Alternatively, the user may specify that on certain times (e.g. days of the week, days of the month), content is to be retrieved from a defined set of websites. For example, a user could request that every Friday websites related to local events be accessed. Further, the user interface of the website marking tool may provide a customizable summary of the amount of content (e.g., highlights, outline, full content) and specificity that is based upon amount of time a user wishes to spend on a page, the type or relevance of content selected by the user of what is contained in the registered site accessible to visitors. This can be accomplished via a pre-programming option or can be performed in real-time, allowing the visitor to have control over time, content, and area of interest based upon the visitor's needs.

Beneficial services for registrants such as real-time information, updates, special offers, a coupon center, product information, demonstration tools, manuals, dealer locations, links, tracking center, and/or advice center maybe included via the tool. The amount of time and content could vary according to the device one accesses the site with (e.g., based on the ability of the device one accesses information with to regulate time and content). For example, if a site is accessed using a PDA, the content may be altered to conform to the reduced bandwidth of such devices. Video demonstrations of product use concerning items sold by a registered site may be provided as well. Directions, maps, and locations of a registered site's franchises may also be provided. Manufacturers of products and services can provide this marking in their packaging and promotion materials, in all media products, services, and promotions identifying their approved status and level membership, and assisting in directing consumers to their website.

Figure 2:
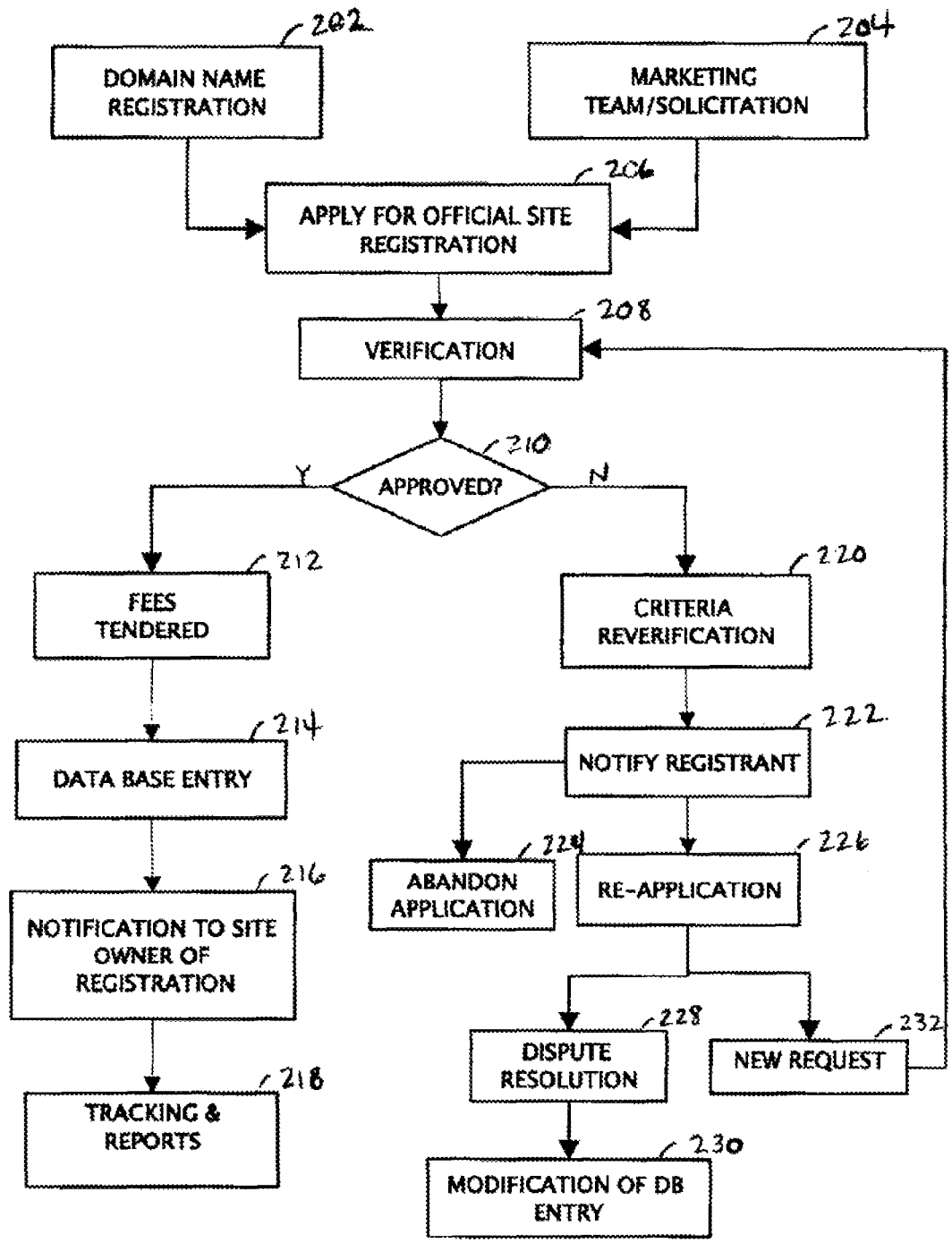
FIG. 2 is a flowchart describing a website registration and marking process for distinguishing and identifying selected uniform resource locators from a list of URL addresses in an exemplary embodiment.

FIG. 2 illustrates the website marking process of the web searching tool. Registration of web sites by a web owner or representative may be accomplished in one of or a combination of various ways. For example, at the time an individual registers a domain name with a commercial domain registry service and pays a fee or is awarded by some means of qualification, he or she may at that time be given information on registering the name and an opportunity to register the domain name via the website marking tool at step 202.

The commercial domain registry service may be a registered domain service such as Domain.com, DomainNameRegistry.com, or may be an online services provider that is authorized to perform registration services as a domain "registrar". Alternatively, the commercial domain registry service may be an online or off-line agent authorized to conduct the registration, certification and marking process.

Another mechanism for initiating registration services is via traditional marketing channels such as direct mail, telemarketing, and even banner advertising at step 204. Once an individual or business decides to register the site, he or she accesses the user interface of the website marking tool and is provided with an application screen (or alternatively, may receive an application via off-line methods) at step 206. The application screen (or hardcopy application) may include requests for specific information in order to determine the eligibility level of the individual and/or the proposed name to be registered. Such information may include the registrant's name, business name, contact information, place and type of business, intellectual property rights in the prospective name, etc. Once the information is received, the verification process is implemented either by the website marking tool, a representative of the tool, or a combination of both at step 208.

Verification items include ensuring that the registrant has the authority to register the site as an official site, ensuring that the name of the site to be registered belongs to the individual groups or business that desires to register it, checking the accuracy of the information in the application, etc.

Once the verification process is completed and the registrant has reached a level of approval at step 210, the registrant may be required to pay a fee for the registration and/or meet approval conditions for use in marketing at step 212. Fees maybe determined using licensing methods, percentage of sales, or other suitable payment methods. The application information is entered into registered website database 107 at step 214. This step includes providing distinctive marking in embedded information, sound, color, identification, or mark associated with the information in order to distinguish the registered official site from non-registered sites. This can be accomplished via HTML tags. The tool then notifies the registrant or site owner of the action by any convenient means such as email, telephone, facsimile, regular mail, etc. at step 216. Once the site has been qualified, the tool may track the activities that occur while the site receives visitors at step 218. Reports, surveys, membership benefits, frequent use incentives, and a variety of official site standards, products, and services can be provided as well indicating the degree of success of the official site.

If the verification process results in the application not being approved at step 210, the tool and/or system can be customized to provide re-verification of the information in the application, noting the level of acceptance, conflicts, options, and/or reasons for disapproval and possible alternatives at step 220. Possible reasons for disapproval may be that the registrant did not complete the application or that the information in the application indicates that the registrant does not meet the criteria for qualifying (or may be qualified under a qualification level system that comprises something that is less than a full qualification status) as an official site.

The applicant is notified of the decision and the reasons therefore at step 222. The registrant may either abandon the request at step 224 or re-apply at step 226. Re-application is available if the registrant pursues the intention to register the name by resolving any conflicts over the rights to the use of the name with the party in conflict at step 228. In this manner, the resolution in favor of the new applicant results in a modification to the database entry in order to designate the new applicant as the official site or affiliate sites or page owner at step 230. Re-application, or automatic approval once certain conditions are met, may also be available if the registrant changes the requested name to one that has not been registered by the tool at step 232. In this manner, the process reverts to step 208 for a subsequent application or second verification and classification.

The registered website entities may incorporate the official distinctive marking indicia in their websites as well as their products, services, and media for promoting brand recognition and customer confidence. The distinctive marking indicia may include a 'seal' or other official designation provided by the website marking tool. These seals or distinctive markings may be promoted to the general public in order to further promote the recognition of the website as an official site. Promotion can occur via banner advertising at the registration service system 102 site, commercial services provider 110 site, printed or online directories of official registered sites, personalized printed labels, stickers, logos, and premiums, electronically and to all media and or other means desired. Further, registered website owners could register multiple sites as official websites.

Registration service system 102 may also provide software tools to registered customers that include additional website marking services such as graphics applications including the seal, unique code or codes which can be UPC codes, names, slogans, or words that identify product, company, or service as well as registered marking indicia for the purpose of enabling the registered website entity to include the markings in its email, correspondence, marketing information and promotions, and media.

Another available service of the website marking tool includes the ability to provide links, special offers, or discounts at a registered or approved website to other registered websites, creating a value-added network of related services. For example, a registered automobile manufacturer may team up with registered insurance providers, consumer loan offices, travel agencies, etc., providing links to information it thinks will be useful to a visitor at the site.

Figure 3:
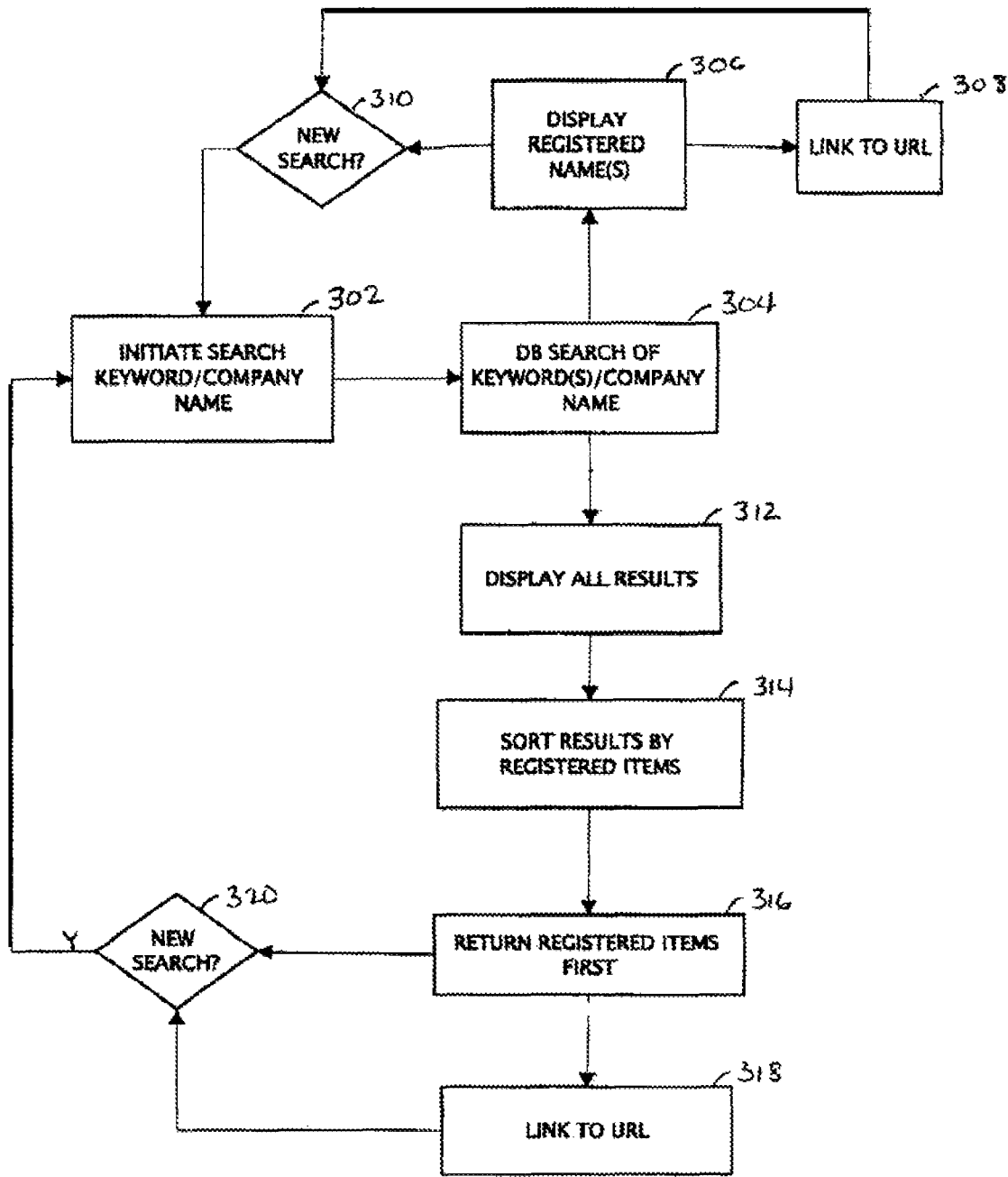
FIG. 3 is a flowchart describing a web search process utilizing the website marking tool in an exemplary embodiment.

FIG. 3 illustrates the process of conducting a search over the web by a user looking for information. A user at one of workstations 120 initiates a web search at step 302. This may be via direct search functions where the website marking tool is accessible to the user via its own website or may be via a commercial search engine that utilizes the website marking tool and perhaps pays a fee its use. It may also be via a web portal dedicated to members.

The website marking database searches for the keyword(s) or products, brand names, or codes that may appear on packaging, slogans, or media that are entered by the user at step 304. Information may alternatively be searched by official site, category, subject matter, preferred list, or other parameters. Further, the searcher may opt to select a minimum or maximum number of sites to display and an amount of time automatically, manually, or in combination that he/she is willing to spend at each site with the ability to expand or limit the amount of time. Depending upon the time selected, the tool would have the ability using defined parameters to automatically retrieve and display the next page in the search results list.

If the website marking tool is accessed directly via the tool's website at registration service system 102, the user may be presented with search results which display only registered sites at step 306. In this manner, the user may either link to the corresponding URL that could be in combination with additional coding and information at step a 308 or may conduct another search at step 310.

If the website marking tool is accessed via a commercial vendor such as commercial service provider 110, the results of the search may include all websites that include the key words entered by the user, including non-registered sites at step 312.

If the user desires to see only the official registered sites, he or she may select a 'sort' option at step 314 whereby the items displayed are represented with the registered sites listed that can be configured by the user in advance or in real-time at various steps of the search and viewing process at step 316. The user may link to the desired URL at step 318 and/or may conduct a new search at step 320 as desired. Alternatively, commercial service provider 110 may provide a user with an option to search for only official registered sites (not shown) via a filter device.

FIG. 4 illustrates a sample search query results page where a hypothetical search engine, "Searchscape" conducted a search for key words "Yankees Baseball" entered by a user via the website markings tool of the invention. The search uncovered 216 hits of items with the key words indicated. The user can easily distinguish the official site or sites of the Yankees® from the other 216 results as it includes a marking represented as a series of asterisks following the title.

It will be understood that any distinctive marking may be employed by the tool, samples of which are shown in FIGS. 5A-5E for illustrative purposes. Further, an option to sort the search results by these distinctive markings may be accessed by a user via the tool in order to further refine the search results. In this mariner, the result 402 in FIG. 4 would be shown at the top or other desired location of the users display screen.

In addition to distinguishing a website as an "official site" to web searchers, the web marking tool or tools may provide additional services via website marking indicia. FIGS. 5A-5E illustrate sample website markings provided by the website marking tool. FIG. 5E illustrates a website marking including a "dot" that is encapsulated in a box. This box could be configured to contain information provided by the registered website owner whereby upon "clicking" on a box or otherwise selecting an item takes a user to a specified website. This may be useful where registered website owners offer multiple sites and incorporated in all media.

Other information may be incorporated into the box such as promotional data, geographic location of the business, etc. Website markings may be configured to further distinguish among the registered websites utilizing color, graphics, size, layout, embedded information, and biometric electronic information. These may be pre-defined in order to classify and/or categorize the registered websites. These and other classifications may be included to designate a primary and secondary site of a registered website owner.

The marking indicia may also be placed in other forms of media other than on websites. The marking indicia may be included on documents such as direct mail, newspapers, company reports, sales circulars, advertisements, etc. The marking indicia serves to identify the "official" source whether in electronic media (e.g., websites) or physical media.

In addition to these markings, a registered official website owner may apply an audible sound, or tone that confirms the official site, graphics and/or company seal, slogan, logo, etc. to inform the visitor that an official site has been reached. The sound may also include a series of tones that are associated with the website business and are familiar to the general public.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, or any other computer-readable storage medium, wherein, when the computer program code is loaded into and executed by a computer, the computer becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A system for facilitating website searching and brand recognition capabilities over a computer network, comprising:
    a server configured to be in communication with at least one search engine and with at least one user system;
    a website marking tool including a user interface executing on said server, said website marking tool providing registration services for qualified websites;
    a data storage device in communication with said server, said data storage device storing databases of registered website addresses; and
    wherein said website marking tool provides one or more distinctive marking indicia to said registered website addresses, said marking indicia operable for promoting brand recognition and facilitating website searching by distinguishing said registered website addresses from non-registered website addresses displayed at said at least one user system in response to a web search initiated at said at least one user system.

2. The system of claim 1, further configured to communicate with a commercial services provider, wherein said website marking tool provides said commercial services provider with access to said databases of registered website addresses and said user interface, said access to said databases and said user interface occurring via at least one of: a hypertext transfer protocol link or a software download provided via said website marking tool.

3. The system of claim 2, wherein said website marking tool provides said commercial services provider with access to said registration services, said access to said registration services occurring via at least one of: a hypertext transfer protocol link or a software download provided via said website marking tool.

4. The system of claim 3, wherein said commercial services provider comprises at least one of: an Internet service provider; a commercial portal; or a domain name registrar.

5. The system of claim 2, wherein said commercial services provider comprises at least one of: a search engine or a web browser.

6. The system of claim 1, wherein said website marking tool provides said at least one user system with access to said databases of registered website addresses and said user interface, said access occurring via at least one of: a hypertext transfer protocol link or a software download provided via said website marking tool.

7. The system of claim 1, wherein said at least one user system comprises a computer processing device operated by at least one of: a private individual; an organization; a commercial vendor; a government agency representative; a consumer advocacy representative; a website operator; or a website owner.

8. The system of claim 1, wherein said distinctive marking indicia include at least one of: a seal; a color; a symbol; embedded data; biometric data; a type font; a type size; a graphical layout; graphical data; audio data; a product identification; a product model; a logo; a slogan; or smartcard data.

9. The system of claim 1, wherein content provided to said user system is dependent on the type of said user system.

10. A computer-implemented method for providing services over a computer network, the method comprising:
    communicating, by a server, with at least one search engine and with at least one user system;
    providing, by the server, a user interface;
    providing registration services for qualified websites;
    storing registered website addresses in a database; and
    providing one or more distinctive marking indicia to said registered website addresses, said marking indicia operable for promoting brand recognition and facilitating website searching by distinguishing said registered website addresses from non-registered website addresses displayed at said at least one user system in response to a web search initiated at said at least one user system.

11. The method of claim 10, further comprising providing to a commercial services provider access to said databases of registered website addresses and said user interface.

12. The method of claim 11, further comprising providing said commercial services provider with access to said registration services.

13. The method of claim 12, wherein said commercial services provider comprises at least one of: an Internet service provider; a commercial portal; or a domain name registrar.

14. The method of claim 11, wherein said commercial services provider comprises at least one of: a search engine or a web browser.

15. The method of claim 10, further comprising providing said at least one user system with access to said databases of registered website addresses and said user interface.

16. The method of claim 10, wherein said distinctive marking indicia include at least one of: a seal; a color; a symbol; embedded data; biometric data; a type font; a type size; a graphical layout; graphical data; audio data; a product identification; a product model; a logo; a slogan; or smartcard data.

17. The method of claim 10, wherein content provided to said user system is dependent on the type of said user system.

18. A website marking tool for facilitating brand recognition capabilities over a computer network, comprising:
  at least one database operable for storing registered website addresses;
  a database of one or more distinctive marking indicia;
  a user interface in communication with said at least one database, said user interface including an application screen or other form operable for receiving registration data from a registrant;
  a means for providing one or more distinctive marking indicia to registered website addresses;
  a means for linking each of said registered website addresses stored in said at least one database with a server, said server comprising a storage facility for a corresponding registrant's website; and
  a means for cross-linking a first registered website address with a second registered website address.

19. The website marking tool of claim 18, further comprising: software operable for enabling a registered website entity to post selected distinctive marking indicia on a corresponding website.

20. The website marking tool of claim 19, wherein said software further enables said registered website entity to apply said selected distinctive marking indicia on at least one of said entity's: promotional material; stationary; products; or product packaging.

21. The website marking tool of claim 18, wherein said user interface includes a means for customizing presentation of content contained in a registered site, said customizing including: a time select option operable for designating an amount of time a web page may be displayed; and a summary option operable for summarizing points of interest determined by said user.

22. The website marking tool of claim 21, wherein the amount of time is defined as short, medium or long.

23. The website marking tool of claim 18, wherein said registration data requested of said registrant via said application screen include: a description of intellectual property rights relevant to said registrant's website; contact information; a primary selection comprising a first website name, wherein said registrant indicates a principal website in relation to another website associated with said registrant; an optional secondary selection comprising a second website name, wherein said registrant indicates a subordinate website in relation to said first website name; and an optional multiple listing selection wherein said applicant requests registration services for multiple website addresses.

24. The website marking tool of claim 18, wherein said registration data is verified by at least one of: a human operator associated with an entity executing said website marketing tool; an automated feature of said website marking tool; or a combination of said human operator and said website marking tool.

25. The website marking tool of claim 18, further comprising:
  a means for notifying said registrant of an approval status;
  a means for re-verifying said registrant's application upon a request from said registrant;
  a means for tracking effectiveness of said registered website addresses based upon for searches performed over time; and
  a means for generating reports.

26. A storage medium encoded with machine-readable instructions that, upon execution by a computing device, result in the implementation of operations comprising:
  communicating with at least one search engine and with at least one user system;
  providing a user interface;
  providing registration services for qualified websites;
  storing registered website addresses in a database; and
  providing one or more distinctive marking indicia to said registered website addresses, said marking indicia operable for promoting brand recognition and facilitating website searching by distinguishing said registered website addresses from non-registered website addresses displayed at said at least one user system in response to a web search initiated at said at least one user system.

27. The medium of claim 26, wherein the operations further comprise providing to a commercial services provider access to said databases of registered website addresses and said user interface.

28. The medium of claim 27, wherein the operations further comprise providing said commercial services provider with access to said registration services.

29. The medium of claim 26, wherein the operations further comprise providing said at least one user system with access to said databases of registered website addresses and said user interface.

30. A computer-implemented method for facilitating website searching and brand recognition capabilities over a computer network, comprising:
  providing, by a computing device, an application to a registrant, said registrant requesting to register at least one website, wherein said application includes requests for data;
  upon receiving a completed application from said registrant, implementing a verification process for determining eligibility of said website based upon data provided in said completed application, said verification process including:
    ensuring said registrant has authority to register said website;
    ensuring said registrant has a proprietary interest in said website; and
    checking application data for accuracy;
  if said application is approved:
    entering said application data into a database;
    providing distinctive marking indicia to said application data; and notifying said registrant that said application is approved;
and if said application is not approved, notifying said registrant and performing at least one of: conducting a re-verification of said application, wherein said application is incomplete and registrant provides missing information; or providing said registrant with a re-application option wherein said registrant resolves any conflicts responsible for causing disapproval of said application.

31. The method of claim 30, wherein the method further comprises, if said application is approved:
tracking website activity occurring at said website; and
providing reports relating to website activities to said registrant.

32. A storage medium encoded with machine-readable instructions that, upon execution by a computing device, result in the implementation of operations comprising:
providing an application to a registrant, said registrant requesting to register at least one website, wherein said application includes requests for data;
upon receiving a completed application from said registrant, implementing a verification process for determining eligibility of said website based upon data provided in said completed application, said verification process including:
ensuring said registrant has authority to register said website;
ensuring said registrant has a proprietary interest in said website; and
checking application data for accuracy;
if said application is approved:
entering said application data into a database;
providing distinctive marking indicia to said application data; and
notifying said registrant that said application is approved;
and
if said application is not approved, notifying said registrant and performing at least one of: conducting a re-verification of said application, wherein said application is incomplete and registrant provides missing information; or providing said registrant with a re-application option wherein said registrant resolves any conflicts responsible for causing disapproval of said application.

33. The storage medium of claim 32, wherein the operations further comprise, if said application is approved:
tracking website activity occurring at said website; and
providing reports relating to website activities to said registrant.

\* \* \* \* \*

UNITED STATES PATENT AND TRADEMARK OFFICE
CERTIFICATE OF CORRECTION

PATENT NO. : 7,912,897 B2  
APPLICATION NO. : 11/679217  
DATED : March 22, 2011  
INVENTOR(S) : Grossman It is certified that error appears in the above-identified patent and that said Letters Patent is hereby corrected as shown below:

Title page, item (54), under "Title", in Column 1, Line 1, delete "METHOD SYSTEM" and insert -- METHOD, SYSTEM, --.

Column 1, line 1, delete "METHOD SYSTEM" and insert -- METHOD, SYSTEM, --.

Signed and Sealed this  
Fifth Day of July, 2011

David J. Kappos  
*Director of the United States Patent and Trademark Office*